T. CROWE.
ROLLER JOURNAL BEARING.
APPLICATION FILED JULY 24, 1919.

1,344,868. Patented June 29, 1920.

INVENTOR.
T CROWE
BY Featherstonhaugh & Co.
ATTYS.

UNITED STATES PATENT OFFICE.

THOMAS CROWE, OF HAMILTON, ONTARIO, CANADA.

ROLLER JOURNAL-BEARING.

1,344,868.

Specification of Letters Patent.   Patented June 29, 1920.

Application filed July 24, 1919. Serial No. 313,029.

*To all whom it may concern:*

Be it known that I, THOMAS CROWE, of the city of Hamilton, in the county of Wentworth, Province of Ontario, Dominion of Canada, have invented certain new and useful Improvements in Roller Journal-Bearings, of which the following is the specification.

My invention relates to improvements in roller journal bearings, and the object of the invention is to devise a roller bearing in which the rollers will not become displaced as has hitherto been the case.

My invention consists of a roller bearing constructed and arranged as hereinafter more particularly explained and illustrated in the accompanying drawing, in which:—

Like characters of reference indicate corresponding parts in the different views.

Figure 3:
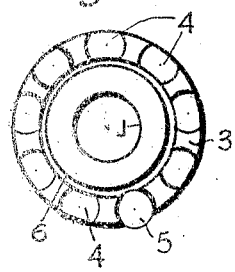
Fig. 3 is a side elevation of an annular member having sockets for the reception of the rollers and designed to be formed up into a cone frustum after the rollers are in place.
Figure 5:
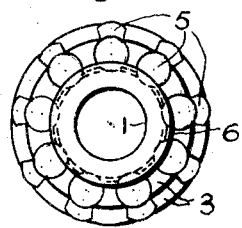
Fig. 5 is a side elevation of the annular member after it has been formed up into a cone frustum.
Figure 4:
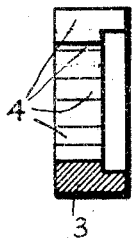
Fig. 4 is a cross section of the annular member.
Figure 1:
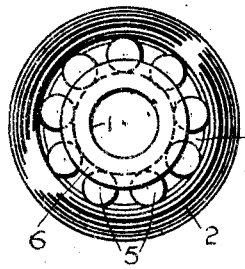
Figure 1 represents a side elevation of a roller bearing constructed according to my invention.
Figure 2:
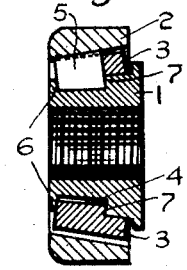
Fig. 2 is a cross section thereof.

1 is the inner roller race designed to be secured to an axle and provided with a shoulder 7. 2 is the outer roller race. 3 is the annular member having the sockets 4 for the reception of the conical rollers 5. 6 is a flange on the inner roller race 1 designed to prevent the displacement of the annular member when it has been formed up into a cone frustum.

The operation of the device is as follows:

The conical rollers 5 are inserted into the sockets 4, of the annular member 3. The inner roller race 1 is inserted into the annular member so that the rollers engage the race of the same, the annular member is then formed up into a cone frustum. The walls of the socket will thus converge and the periphery of one side of the annular member will become smaller and engage the flange 6 of the inner roller race 1. At the same time the converging walls will prevent any displacement of the conical rollers 5, and such rollers will be retained between the flange 6 and the shoulder 7 of the inner roller race 1.

What I claim as my invention is:

1. In a roller bearing, the combination with the outer and inner races, of conical rollers, an annular member having a plurality of notches constituting sockets for the rollers, said annular member being formed up into a cone frustum by external pressure after insertion of the rollers into the sockets.

2. A roller bearing comprising concentric outer and inner races, an annular member having a plurality of notches constituting sockets, and frusto-conical rollers inserted into the sockets, the diameter of said sockets being of substantially the diameter of the larger ends of the rollers, said annular member being formed up into a cone frustum by external pressure after insertion of the rollers into the sockets.

3. In a roller bearing, frusto-conical rollers, an annular member constituting a cage having a plurality of split sockets with concave radial walls, the radius of the concave walls being substantially the radius of the larger ends of the frusto-conical rollers, said annular member being formed up into a cone frustum by external pressure after insertion of the rollers into the sockets.

THOMAS CROWE.

Witnesses:
M. B. GUEST,
GERTRUDE NICHOLSON.